United States Patent [19]

Alpha et al.

[11] Patent Number: 4,971,932

[45] Date of Patent: Nov. 20, 1990

[54] MAGNETIC MEMORY STORAGE DEVICES

[75] Inventors: James W. Alpha, Corning; Walter L. Morgan, Painted Post; Linda R. Pinckney, Corning, all of N.Y.

[73] Assignee: Corning Incorporated, Corning, N.Y.

[21] Appl. No.: 314,883

[22] Filed: Feb. 24, 1989

[51] Int. Cl.$^5$ .............................................. C03C 10/14
[52] U.S. Cl. ........................................ 501/3; 428/692; 428/693; 428/702
[58] Field of Search ............... 501/3, 4, 9; 427/128, 427/127; 428/426, 692, 693, 694, 695, 701, 702, 900

[56] References Cited

U.S. PATENT DOCUMENTS

| | | |
|---|---|---|
| 4,386,162 | 5/1983 | Beall ........................................ 501/3 |
| 4,464,475 | 8/1984 | Beall et al. ............................... 501/9 |
| 4,467,039 | 8/1984 | Beall et al. ............................... 501/3 |
| 4,608,348 | 8/1986 | Beall et al. ............................... 501/3 |
| 4,690,846 | 9/1987 | Wada et al. ............................. 428/64 |

FOREIGN PATENT DOCUMENTS 3210039 2/1987 Japan .

*Primary Examiner*—William R. Dixon, Jr.
*Assistant Examiner*—Chris Gallo
*Attorney, Agent, or Firm*—Clinton S. Janes, Jr.

[57] ABSTRACT

The present invention is related to the fabrication of a magnetic memory storage device consisting essentially of a head pad and a rigid information disk, which disk consists essentially of a rigid substrate having a coating of magnetic media on the surface thereof facing the head pad. More particularly, this invention is directed to a substrate for use in the disk. The substrate is selected from two different groups of glass-ceramics: the first group contains a sheet silicate as the predominant crystal phase; and the second group contains a chain silicate as the predominant crystal phase.

21 Claims, 1 Drawing Sheet

MAGNETIC MEMORY STORAGE DEVICES

BACKGROUND OF THE INVENTION

In the most general terms a magnetic memory storage device consists essentially of two fundamental units, viz., a head pad or slider and a rigid information disk. The head pad supports an element which is capable of reading or writing data magnetically on the information disk; the latter consisting essentially of two basic components, viz., a rigid substrate (conventionally aluminum metal) and a coating of magnetic media on the surface thereof facing the head pad.

The market for rigid magnetic storage is well established and growing, with even greater advances being foreseen through the utilization of thin film media technology. Increased information densities, higher disk rotation speeds, and lower head flying heights not only afford greater efficiencies in data storage and retrieval, but also demand extremely tight tolerances to be held in the substrate specifications for flatness, rigidity at high rotational velocities, and surface texture. Where the product is designed for the high performance market, high capacity and rapid access characteristics are key requirements. Moreover, the current trend toward smaller disk drives and less powerful motors, particularly for the rapidly developing markets for slimline and portable drives, calls for thin, lightweight, rugged disks that have high functional densities and are capable of withstanding frequent takeoffs and landings with no deterioration in performance. The standard aluminum metal disk has difficulty meeting those enhanced performance requirements at a competitive cost.

As noted above, rigid disk substrates designed for high performance applications must meet a wide range of criteria. To illustrate:

(a) the substrates must meet stringent requirements for flatness (for example, a disk having an outside diameter of 95 mm cannot be as much as 10 microns out of flat across its diameter and should have concentricity within 50 microns);

(b) the substrate should have a defect-free, non-porous surface which will also preferably be highly resistant to scratches;

(c) the substrate material should be strong and sufficiently rigid to allow the fabrication of very thin disks (<1 mm thickness) which are dimensionally stable during speeds of rotation up to 7200 rpm;

(d) the surface of the substrate needs a slight uniform texture, i.e., an average roughness of about 1.5-6 nm, in order to provide a suitably low coefficient of "stiction," which is a measure of the interaction between a head and the disk; a low coefficient leads to improved media wear characteristics and improved start/stop characteristics;

(e) the substrate material should be corrosion resistant and compatible with magnetic media;

(f) the substrate should demonstrate a high surface hardness to resist scratching and damage resulting from head slap; the latter feature being especially important in portable drives;

(g) the substrate should exhibit good thermal hardness to permit the deposition of thin films thereon at elevated temperatures resulting in better film deposition and higher coercivity magnetics;

(h) the substrate will be re-workable; i.e., be capable of being re-used upon removal of the magnetic media coatings; and, finally, (i) the substrate disks must be extremely reliable, be of consistent high quality, and be able to be manufactured at a competitive cost.

Accordingly, the overriding objective of the present invention was to improve the performance of magnetic memory storage devices. And in order to achieve that overriding objective, a specifically-defined objective of the present invention was to fabricate rigid information disks wherein the substrate component thereof would satisfy each of the above-cited criteria.

SUMMARY OF THE INVENTION

We have been able to achieve the objective described above through the fabrication of rigid information disks wherein the substrate component is prepared from glass-ceramics in which the crystals present therein fall within two basic systems.

Figure 1:
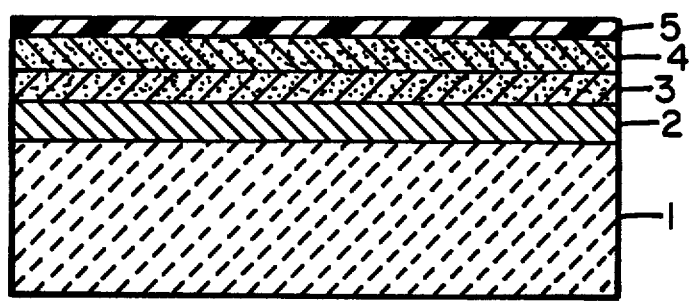
FIG. 1 is a schematic view in side elevation of a rigid information disk utilizing the substrate of the present invention.

FIG. 1 is a highly schematic representation in side view elevation of one style of rigid information disk. Other styles will differ somewhat in the composition of the layers, but the overall purpose and design of the layers will be similar. Thus, in FIG. 1 the substrate is represented by 1 and the layer of magnetic media 3 is joined to substrate 1 through an undercoat 2. Atop the magnetic media is a protective overcoat 4 which, in turn, is covered with lubricating layer 5.

Figure 2:
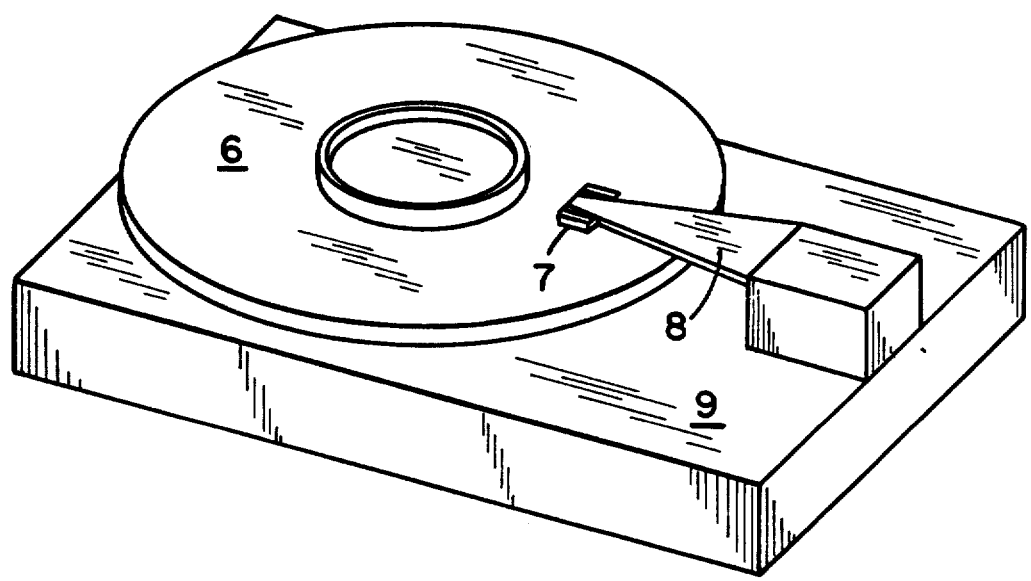
FIG. 2 is a three-dimensional schematic representation of a typical magnetic memory storage device illustrating the two basic units of such a device.

FIG. 2 depicts a magnetic memory storage device 9 wherein the rigid information disk is shown as 6 and 7 represents the head pad which is carried by arm 8 which, in turn, is connected to the necessary operational circuitry (not shown).

Glass-ceramics have been known to the art for about thirty years. In general, glass-ceramics consist of randomly oriented crystals dispersed within a matrix of residual glass and can be produced through controlled internal nucleation and crystallization of a precursor glass body. Hence, a glass forming batch of a desired composition is melted; that melt is cooled and simultaneously formed into a glass shape of a predetermined configuration utilizing conventional glass forming techniques; that glass shape is heat treated in accordance with a predesigned schedule to induce nucleation and growth of crystals on the nuclei; and, thereafter, where necessary, the crystallized article is finished to precise dimensions and desired surface texture.

By the very nature of their chemistries, thermal crystallization histories, and microstructures, glass-ceramics broadly possess attributes which satisfy several of the above-demanded criteria for high performance, rigid disk substrates. Thus, glass-ceramics are non-porous and have an "inherently" textured surface due to their multi-phase nature and their randomly oriented crystals. They exhibit good surface hardness and their surfaces are typically quite scratch resistant. They customarily demonstrate good chemical durability, refractoriness, and surface hardness, and, because they are not prone to corrosion problems, they are media-ready without costly additional processing. In addition, their good chemical durability renders glass-ceramics reworkable. Glass-ceramics can be routinely manufactured with consistent properties, and precisely controlled surfaces can be readily had. Furthermore, because glass-ceramic articles can be formed as glasses to near net size and shape, they may require but a minimum amount of finishing after crystallization, thereby making low cost processing feasible.

A wide range of glass-ceramic compositions and accompanying microstructures for this application was examined experimentally. Each family of compositions exhibited certain advantages. For example, glass-ceramics in the lithium aluminosilicate family ($\beta$-quartz solid solution or $\beta$-spodumene solid solution crystallization) may be either transparent or opaque. Their normally very fine-grained crystalline microstructure yields fine surface textures with average surface roughnesses within the range of 0.4–2 nm. These glass-ceramics typically exhibit excellent chemical durability and low to very low coefficients of thermal expansion. Glass-ceramics in the magnesium aluminosilicate family (cordierite crystallization) also demonstrate low coefficients of thermal expansion, but surface roughnesses on the order of 5–6 nm.

However, we have determined that glass-ceramics in which the crystals present therein are encompassed within two basic systems are eminently suited for the fabrication of rigid information disk substrates for magnetic memory storage devices. The first group of glass-ceramics contains crystals having a sheet silicate microstructure. The second, and more preferred group of glass-ceramics, is prepared from compositions yielding crystals exhibiting a chain silicate microstructure.

Two specifically-defined composition areas within the general system producing glass-ceramics containing synthetic fluormica crystals with a sheet silicate microstructure can be useful as substrates in rigid information disks; viz., those wherein fluorophlogopite solid solution crystals constitute the predominant crystal phase and those wherein tetrasilicic fluormica crystals constitute the predominant crystal phase. Fluorophlogopite solid solution has been postulated to fall within the three components: normal fluorophlogopite, $KMg_3AlSi_3O_{10}F_2$, boron fluorophlogopite, $KMg_3BSi_3O_{10}F_2$, and a subpotassic aluminous phlogopite conjectured to have a formula close to $K_{0.5}Mg_2Al_{0.83}BSi_3O_{10}F_2$. Tetrasilicic fluormica has been described as having the general formula $KMg_{2.5}Si_4O_{10}F_2$. Both crystal structures are based upon a 2 to 1 mica layer wherein one octahedral sheet is sandwiched between two tetrahedral sheets. The resulting microstructure consists of large interlocking platelets of mica exhibiting high aspect ratios. That microstructure not only provides substrates with an inherently-desirable, uniform surface texture, but also imparts the highly useful property of ready machinability thereto. That property is especially valuable from a practical point of view in that any cutting, drilling, sawing, etc. necessary to fashion the substrate into a required configuration can be carried out very easily. Also, the highly crystalline glass-ceramics composed of these randomly-oriented, interlocked, high aspect ratio fluorophlogopite solid solution or tetrasilicic fluormica crystals can be readily produced through the controlled nucleation and crystallization of precursor glass bodies of suitable compositions. Because in order for a fracture to propagate through these glass-ceramics it must follow a tortuous path around each crystal, the bodies demonstrate good mechanical strength and toughness.

U.S. Pat. No. 3,689,293 discloses the production of glass-ceramic articles wherein fluorophlogopite solid solution constitutes the predominant crystal phase, which articles are suitable for the fabrication of substrates for rigid information disks. The glass-ceramics demonstrate modulus of rupture values of about 10,000–20,000 psi and coefficients of thermal expansion (0°–500° C.) of about $90-150\times10^{-7}/°C$. As described in that patent, the glass-ceramics consist essentially, expressed in terms of weight percent on the oxide basis, of

| SiO₂ | 25–60 | Cs₂O | 0–20 |
|---|---|---|---|
| B₂O₃ | 5–15 | Na₂O + K₂O + Rb₂O + Cs₂O | 2–20 |
| Al₂O₃ | 5–25 | MgO | 4–25 |
| B₂O₃ + Al₂O₃ | 15–35 | Li₂O | 0–7 |
| Na₂O | 0–15 | MgO + Li₂O | 6–25 |
| K₂O | 0–15 | F | 4–20 |
| Rb₂O | 0–15 | | |

One glass-ceramic having a composition coming within the above-defined ranges which is useful for fabricating substrates for rigid information disks is a product which is commercially marketed by Corning Glass Works, Corning, N.Y. as Corning 9658 under the trademark MACOR. That glass-ceramic has the following approximate composition (O=F is the oxygen≃-fluoride correction factor):

| SiO₂ | 47.0 | K₂O | 9.5 |
|---|---|---|---|
| B₂O₃ | 8.5 | F | 6.3 |
| Al₂O₃ | 16.7 | O = F | 2.5 |
| MgO | 14.5 | | |

That composition exhibits a modulus of rupture of about 14,000–18,000 psi and a coefficient of thermal expansion of about $94\times10^{-7}/°C$.

U.S. Pat. No. 3,732,087 describes the production of glass-ceramic articles wherein tetrasilicic fluormica constitutes the predominant crystal plane, which articles are suitable for the fabrication of substrates for rigid information disks. Those glass-ceramics consist essentially, expressed in terms of weight percent on the oxide basis, of 45–70% SiO₂, 8–20% MgO, 8–15% MgF₂, 5–25% R₂O, wherein R₂O consists of 0–20% K₂O, 0–20% Rb₂O, and 0–20% Cs₂O, 0–20% RO, wherein RO consists of 0–20% SrO, 0–20% BaO, and 0–20% CdO, and 5–35% R₂O+RO.

Three specifically-defined composition areas within the general system producing glass-ceramics containing crystals having a chain silicate microstructure have been found to be especially suited for the fabrication of substrates for rigid disks; viz., those wherein canasite constitutes the predominant crystal phase, those wherein potassium fluorrichterite constitutes the predominant crystal phase, and those wherein potassium fluorrichterite constitutes the predominant crystal phase, but in which a substantial amount of cristobalite is also present. Canasite has the general formula $K_2.3Na_{4.3}Ca_5Si_{12}O_{30}F_4$ and potassium fluorrichterite has the general formula $KNaCaMg_5Si_8O_{22}F_2$. Both crystal structures are based upon linearly repeating groups, or chains, of corner-shared SiO₄ tetrahedra. As a result of that structure, these crystals tend to be acicular or rodshaped, with cleavage planes parallel to the chains. Cristobalite is a polymorph of silica.

Highly crystalline glass-ceramics composed of these randomly-oriented, tightly-interlocked, high aspect ratio canasite or potassium fluorrichterite crystals can be readily produced through controlled nucleation and crystallization of glasses of suitable compositions. The crystalline microstructure of these glass-ceramics comprises the key to their very high body strength and toughness. Thus, in order for a fracture to propagate through the material, it must follow a tortuous path around each crystal. This microstructure also constitutes the key to their inherent uniform surface texture of desirable roughness.

U.S. Pat. No. 4,386,162 discloses the production of glass-ceramic articles containing canasite and/or agrellite and/or fedorite as the predominant crystal phase. As described therein, the glass-ceramics consist essentially, expressed in terms of weight percent on the oxide basis, of about

| $SiO_2$ | 45–75 | $Na_2O$ | 3–15 | $B_2O_3$ | 0–6 |
|---|---|---|---|---|---|
| CaO | 8–30 | $K_2O$ | 0–20 | $Al_2O_3$ | 0–7 |
| F | 3.5–12 | $Na_2O + K_2O$ | 5–25 | $ZrO_2$ | 0–12 |

We have found that to achieve the production of glass-ceramic bodies containing canasite as the predominant crystal phase which will satisfy the above-demanded criteria, compositions therefor will consist essentially, expressed in terms of weight percent on the oxide basis, of

| $SiO_2$ | 50–70 | F | 4–9 |
|---|---|---|---|
| CaO | 15–25 | MgO | 0–2 |
| $Na_2O$ | 6–10 | ZnO | 0–2 |
| $K_2O$ | 6–12 | $SnO_2$ | 0–2 |
| $Al_2O_3$ | 1–4 | $Sb_2O_3$ | 0–1 | with the more preferred products having compositions consisting essentially of

| $SiO_2$ | 55–60 | $K_2O$ | 8–9.5 |
|---|---|---|---|
| CaO | 20–23 | $Al_2O_3$ | 1.5–2.5 |
| $Na_2O$ | 7.5–9 | F | 5–7.5 |

Two U.S. patents relate to the production of glass-ceramics containing potassium fluorrichterite as the predominant crystal phase. Thus, U.S. Pat. No. 4,467,039 describes glass-ceramics wherein potassium fluorrichterite may be essentially the sole crystal phase present. A very minor amount of canasite may be included. In contrast, U.S. Pat. No. 4,608,348 discloses glass-ceramics wherein potassium fluorrichterite comprises the predominant crystal phase, but which also contain a substantial amount (at least 10%) of cristobalite. The presence of cristobalite can raise the coefficient of thermal expansion up to $140 \times 10^{-7}/°C$.

As described in U.S. Pat. No. 4,467,039, the glass-ceramics consist essentially, expressed in terms of weight percent on the oxide basis, of about

| $SiO_2$ | 50–70 | $Na_2O$ | 2–9 |
|---|---|---|---|
| CaO | 4–15 | $Li_2O$ | 2–12 |
| MgO | 8–25 | $K_2O$ | 0–3 |
| F | 3–8 | $Al_2O_3$ | 0–7 |

We have found that to obtain the manufacture of glass-ceramic bodies containing potassium fluorrichterite as by far the predominant crystal phase which will satisfy the above-outlined criteria, the compositions therefor will consist essentially, expressed in terms of weight percent on the oxide basis, of

| $SiO_2$ | 58–70 | $K_2O$ | 3.8–7 |
|---|---|---|---|
| $Al_2O_3$ | 0.5–3 | $Li_2O$ | 0.5–2 |
| MgO | 13–17.5 | BaO | 0–2.5 |
| CaO | 3–7 | $P_2O_5$ | 0–2.5 |
| $Na_2O$ | 1.5–4 | F | 3–5.5 | with the more preferred compositions consisting essentially of

| $SiO_2$ | 62–67 | $K_2O$ | 3.8–6 |
|---|---|---|---|
| $Al_2O_3$ | 1–3 | $Li_2O$ | 0.5–1.5 |
| MgO | 13.5–16.5 | BaO | 0–2 |
| CaO | 4–7 | $P_2O_5$ | 0–2 |
| $Na_2O$ | 1.5–3.5 | F | 3.3–5 |

U.S. Pat. No. 4,608,348 discloses glass-ceramics consisting essentially, expressed in terms of weight percent on the oxide basis, of

| $SiO_2$ | 65–69 | $Na_2O$ | 1.5–3.3 |
|---|---|---|---|
| $Al_2O_3$ | 0.75–3.5 | $K_2O$ | 4.2–6 |
| MgO | 13.5–17.5 | BaO | 0–2.5 |
| CaO | 3–4.8 | $P_2O_5$ | 0–2.5 |
| $Li_2O$ | 0.5–2 | F | 3.3–5.5 |

We have found that to secure glass-ceramic bodies containing potassium fluorrichterite as the predominant crystal phase, but also containing substantial amounts of cristobalite, which will comply with the vital criteria recited above, the compositions therefor will consist essentially, expressed in terms of weight percent on the oxide basis, of

| $SiO_2$ | 65–69 | $K_2O$ | 4.2–6 |
|---|---|---|---|
| $Al_2O_3$ | 0.75–3 | $Li_2O$ | 0.5–2 |
| MgO | 13.5–16.5 | BaO | 0–2 |
| CaO | 3–4.8 | $P_2O_5$ | 0–2 |
| $Na_2O$ | 1.5–3.3 | F | 3.3–5 |

DESCRIPTION OF PREFERRED EMBODIMENTS

Glass forming batches for the canasite- and potassium fluorrichterite-containing glass-ceramic precursor glasses are easily melted and can be shaped into articles of widely-varying geometries using such conventional glass forming processes as drawing, precision rolling, pressing, and spinning. The properties of the resultant glass-ceramics rendering them eminently suitable for high performance rigid disk substrates include:

(1) High body strengths and fracture toughnesses as reflected in moduli of rupture ranging about 15,000–40,000 psi and $K_{IC}$ values between about 3–5 MPa$\sqrt{m}$. That combination of properties allows the fabrication of very thin, rigid disks, i.e., $\approx$0.5–0.6 mm in thickness.

(2) An elastic modulus similar to that of aluminum metal such that the material is dimensionally stable at all thicknesses and rotational velocities.

(3) A hard surface hardness (Knoop hardness >500 in contrast with <100 for aluminum) which imparts high scratch resistance.

(4) Precision (flat and smooth) surfaces are readily available for tight, consistent control of properties.

(5) A thermal expansion that can be carefully controlled through composition between about $75-125 \times 10^{-7}/°C$. over the temperature range $25°-300°$ C., the higher value approaching that of stainless steel.

(6) A body exhibiting excellent chemical durability in moist environments.

(7) A body with an inherently textured surface of the desired roughness ($R_a = 1.5-5$ nm) for enhanced magnetics and lower flying height.

Feature (7) is of special value inasmuch as no texturizing operation is required, either mechanical or chemical, to bring the surface in condition for application of the magnetic medium. This factor permits a major cost savings to be enjoyed over the conventional procedures necessary for placing the surface of aluminum or glass in condition to receive the magnetic medium. Furthermore, we have found that the surface texture or "roughness" of the inventive glass-ceramics can be tailored to yield a $R_a$ value within the range of about 1-6 nm by means of minor adjustments in composition, especially through changes in levels of fluoride. Of course, it will be appreciated that the surface texture can also be modified through mechanical or chemical means, e.g., by grinding and polishing or chemical etching.

Two tests have been devised to determine the utility of a material as a rigid disk substrate. A Start/Stop test measures the "stiction" coefficient as the disk is started and stopped repeatedly over tens of thousands of cycles. A Take-Off and Landing Velocity test measures two parameters; viz., the rotational velocity of the disk when the head lifts off the surface, and the distance the head slides on the surface of the disk before it lifts off. Those two parameters are clearly related to the acceleration of the disk as it begins to rotate.

In the Start/Stop test, aluminum disks typically exceed the industry-specified "stiction" coefficient limit of 0.5 at 30,000 cycles. In contrast, disks utilizing substrates prepared from compositions of the three abovedescribed, chain silicate systems of glass-ceramics can exceed 100,000 cycles without reaching the "stiction" coefficient of 0.5. In one Start/Stop test utilizing a canasite glass-ceramic substrate, the "stiction" coefficient of 0.5 was not reached in over 200,000 cycles. It is also worthy of note that inspection of the magnetic heads employed in the Start/Stop tests using that glass-ceramic substrate indicated that no more material was transferred to the heads after 200,000 cycles than the amount which was transferred thereto from the aluminum disks after only 30,000 cycles.

In the Take-Off and Landing Velocity tests, aluminum disks customarily exhibit a sliding distance of about 57 inches ($\approx 145$ cm), whereas disks prepared from the three above-described, chain silicate glass-ceramics can demonstrate a sliding distance of less than 12 inches ($\approx 30$ cm), with the above-described canasite glass-ceramic substrate exhibiting a sliding distance of no more than about 7 inches ($\approx 18$ cm).

The table below records three glass compositions, expressed in terms of parts by weight on the oxide basis, which, when crystallized, illustrate the three chain silicate glass-ceramic systems operable in forming substrates complying with the above-described vital criteria. Inasmuch as it is not known with which cation(s) the fluoride is combined, it is merely tabulated in terms of fluoride, in accordance with conventional glass and glass-ceramic analysis practice. Furthermore, because the sum of the individual constituents in each glass closely approximates 100, for all practical purposes the reported values in the table may be deemed to represent weight percent. The actual batch ingredients can comprise any materials, either oxides or other compounds, which, when melted together, will be converted into the desired oxides in the proper proportions. For example, $CaCO_3$ and $MgCO_3$ can serve as the batch materials for CaO and MgO, respectively.

The table also recites the crystal phase(s) generated in the glasses upon heat treatment to a glass-ceramic, along with values, where measured, of coefficient of thermal expansion [Exp. Coef.] ($25°-300°$ C.) expressed in terms of $x\ 10^{-7}/°C$., modulus of rupture [MOR] expressed in terms of psi, $K_{IC}$ expressed in terms of $MPa\sqrt{m}$, Knoop hardness, and surface roughness [$R_a$] expressed in terms of nanometers.

TABLE

|  | 1 | 2 | 3 |
|---|---|---|---|
| SiO$_2$ | 57.3 | 65.6 | 67.6 |
| Al$_2$O$_3$ | 2.0 | 2.0 | 1.6 |
| MgO | — | 14.8 | 14.1 |
| CaO | 20.2 | 6.2 | 4.6 |
| Na$_2$O | 8.0 | 3.0 | 3.2 |
| K$_2$O | 8.8 | 4.2 | 4.7 |
| Li$_2$O | — | 0.8 | 0.88 |
| BaO | — | 0.25 | 0.22 |
| P$_2$O$_5$ | — | 0.75 | 1.2 |
| F | 6.3 | 4.2 | 3.3 |
| Crystals | Canasite Minor CaF$_2$ | Potassium Fluorrichterite Minor mica | Potassium Fluorrichterite Cristobalite Minor mica |
| Exp. Coef. | 120 | 75 | 120 |
| MOR | 40,000 | 25,000 | 20,000 |
| K$_{IC}$ | 5.0 | — | 3.0 |
| Knoop | >500 | >500 | >500 |
| R$_a$ | 1-6 | 1-6 | 1-6 |

Based upon the overall combination of physical properties, glass-ceramics wherein canasite constitutes the predominant crystal phase (illustrated in Example 1 above) comprise the most preferred substrate material.

We claim:

1. In a magnetic memory storage device consisting essentially of a head pad and a rigid information disk, said disk consisting essentially of a rigid substrate having a coating of magnetic media on the surface thereof facing said magnetic head, the improvement which comprises using a disk having a modulus of rupture ranging from about 15,000-40,000 psi and having a textured surface roughness of about $R_a = 1.5-5$ nm, in which said substrate consists essentially of a glass-ceramic wherein the predominant crystal phase present has a microstructure selected from the group consisting of a sheet silicate and a chain silicate.

2. A magnetic memory storage device according to claim 1 wherein the crystal phase which has a sheet silicate microstructure present in said glass-ceramic substrate is selected from the group consisting of predominantly fluorophlogopite solid solution and predominantly tetrasilicic fluormica.

3. A magnetic memory storage device according to claim 2 wherein said glass-ceramic substrate in which the crystal phase consists predominantly of fluorophlogopite solid solution has a composition consisting essentially, expressed in terms of weight percent on the oxide basis, of

| SiO$_2$ | 25-60 | Cs$_2$O | 0-20 |
|---|---|---|---|
| B$_2$O$_3$ | 5-15 | Na$_2$O + K$_2$O + Rb$_2$O + Cs$_2$O | 2-20 |
| Al$_2$O$_3$ | 5-25 | MgO | 4-25 |
| B$_2$O$_3$ + Al$_2$O$_3$ | 15-35 | Li$_2$O | 0-7 |
| Na$_2$O | 0-15 | MgO + Li$_2$O | 6-25 |
| K$_2$O | 0-15 | F | 4-20 |
| Rb$_2$O | 0-15 | | |

4. A magnetic memory storage device according to claim 3 wherein said glass-ceramic substrate consists essentially of about

| SiO$_2$ | 47.0 | K$_2$O | 9.5 |
|---|---|---|---|
| B$_2$O$_3$ | 8.5 | F | 6.3 |
| Al$_2$O$_3$ | 16.7 | O = F | 2.5 |
| MgO | 14.5 | | |

5. A magnetic memory storage device according to claim 2 wherein said glass-ceramic substrate in which the crystal phase consists predominantly of tetrasilicic fluormica has a composition consisting essentially, expressed in terms of weight percent on the oxide basis, of 45-70% SiO$_2$, 8-20% MgO, 8-15% MgF$_2$, 5-25% R$_2$O, wherein R$_2$O consists of 0-20% K$_2$O, 0-20% Rb$_2$O, and 0-20% Cs$_2$O, 0-20% RO, wherein RO consists of 0-20% SrO, 0-20% BaO, and 0-20% CdO, and 5-35% R$_2$O+RO.

6. A magnetic memory storage device according to claim 1 wherein the crystal phase having a chain silicate microstructure present in said glass-ceramic substrate is selected from the group consisting of predominantly canasite, predominantly potassium fluorrichterite, and predominantly potassium fluorrichterite, but also containing a substantial amount of cristobalite.

7. A magnetic memory storage device according to claim 6 wherein said glass-ceramic substrate in which the crystal phase consists predominantly of canasite has a composition consisting essentially, expressed in terms of weight percent on the oxide basis, of

| SiO$_2$ | 50-70 | MgO | 0-2 |
|---|---|---|---|
| CaO | 15-25 | ZnO | 0-2 |
| Na$_2$O | 6-10 | SnO$_2$ | 0-2 |
| K$_2$O | 6-12 | Sb$_2$O$_3$ | 0-1 |
| Al$_2$O$_3$ | 1-4 | F | 4-9 |

8. A magnetic memory storage device according to claim 7 wherein said glass-ceramic substrate has a composition consisting essentially of

| SiO$_2$ | 55-60 | K$_2$O | 8-9.5 |
|---|---|---|---|
| CaO | 20-23 | Al$_2$O$_3$ | 1.5-2.5 |
| Na$_2$O | 7.5-9 | F | 5-7.5 |

9. A magnetic memory storage device according to claim 6 wherein said glass-ceramic substrate in which the crystal phase consists predominantly of potassium fluorrichterite has a composition consisting essentially, expressed in terms of weight percent on the oxide basis, of

| SiO$_2$ | 58-70 | K$_2$O | 3.8-7 |
|---|---|---|---|
| Al$_2$O$_3$ | 0.5-3 | Li$_2$O | 0.5-2 |
| MgO | 13-17.5 | BaO | 0-2.5 |
| CaO | 3-7 | P$_2$O$_5$ | 0-2.5 |
| Na$_2$O | 1.5-4 | F | 3-5.5 |

10. A magnetic memory storage device according to claim 9 wherein said glass-ceramic substrate has a composition consisting essentially of

| SiO$_2$ | 62-67 | K$_2$O | 3.8-6 |
|---|---|---|---|
| Al$_2$O$_3$ | 1-3 | Li$_2$O | 0.5-1.5 |
| MgO | 13.5-16.5 | BaO | 0-2 |
| CaO | 4-7 | P$_2$O$_5$ | 0-2 |
| Na$_2$O | 1.5-3.5 | F | 3.3-5 |

11. A magnetic memory storage device according to claim 6 wherein said glass-ceramic substrate in which the crystal phase consists predominantly of potassium fluorrichterite, but also contains a substantial amount of cristobalite, has a composition consisting essentially, expressed in terms of weight percent on the oxide basis, of

| SiO$_2$ | 65-69 | K$_2$O | 4.2-6 |
|---|---|---|---|
| Al$_2$O$_3$ | 0.75-3 | Li$_2$O | 0.5-2 |
| MgO | 13.5-16.5 | BaO | 0-2 |
| CaO | 3-4.8 | P$_2$O$_5$ | 0-2 |
| Na$_2$O | 1.5-3.3 | F | 3.3-5 |

12. A rigid information disk for use in a magnetic memory storage device consisting essentially of a substrate with a coating of magnetic media on a surface thereof, in which said substrate consists essentially of a glass-ceramic wherein the predominant crystal phase present has a microstructure selected from the group consisting of a sheet silicate and a chain silicate.

13. A rigid information disk according to claim 12 wherein the crystal phase having a sheet silicate microstructure present in said glass-ceramic substrate is selected from the group consisting of predominantly fluorophlogopite solid solution and predominantly tetrasilicic fluormica.

14. A rigid information disk according to claim 13 wherein said glass-ceramic substrate in which the crystal phase consists predominantly of fluorophlogopite solid solution has a composition consisting essentially, expressed in terms of weight percent on the oxide basis, of

| SiO$_2$ | 25-60 | Cs$_2$O | 0-20 |
|---|---|---|---|
| B$_2$O$_3$ | 5-15 | Na$_2$O + K$_2$O + Rb$_2$O + Cs$_2$O | 2-20 |
| Al$_2$O$_3$ | 5-25 | MgO | 4-25 |
| B$_2$O$_3$ + Al$_2$O$_3$ | 15-35 | Li$_2$O | 0-7 |
| Na$_2$O | 0-15 | MgO + Li$_2$O | 6-25 |
| K$_2$O | 0-15 | F | 4-20 |
| Rb$_2$O | 0-15 | | |

15. A rigid information disk according to claim 14 wherein said glass-ceramic substrate consists essentially of about

| SiO$_2$ | 47.0 | K$_2$O | 9.5 |
|---|---|---|---|
| B$_2$O$_3$ | 8.5 | F | 6.3 |
| Al$_2$O$_3$ | 16.7 | O = F | 2.5 |
| MgO | 14.5 | | |

16. A rigid information disk according to claim 13 wherein said glass-ceramic substrate in which the crystal phase consists predominantly of tetrasilicic fluormica has a composition consisting essentially, expressed in terms of weight percent on the oxide basis, of 45–70% $SiO_2$, 8–20% MgO, 8–15% $MgF_2$, 5–25% $R_2O$, wherein $R_2O$ consists of 0–20% $K_2O$, 0–20% $Rb_2O$, and 0–20% $Cs_2O$, 0–20% RO, wherein RO consists of 0–20% SrO, 0–20% BaO, and 0–20% CdO, and 5–35% $R_2O+RO$.

17. A rigid information disk according to claim 12 wherein the crystal phase having a chain silicate microstructure present in said glass-ceramic substrate is selected from the group consisting of predominantly canasite, predominantly potassium fluorrichterite, and predominantly potassium fluorrichterite, but also containing a substantial amount of cristobalite.

18. A rigid information disk according to claim 17 wherein said glass-ceramic substrate in which the crystal phase consists predominantly of canasite has a composition consisting essentially, expressed in terms of weight percent on the oxide basis, of

| $SiO_2$ | 50–70 | MgO | 0–2 |
|---|---|---|---|
| CaO | 15–25 | ZnO | 0–2 |
| $Na_2O$ | 6–10 | $SnO_2$ | 0–2 |
| $K_2O$ | 6–12 | $Sb_2O_3$ | 0–1 |
| $Al_2O_3$ | 1–4 | F | 4–9 |

19. A rigid information disk according to claim 18 wherein said glass-ceramic substrate has a composition consisting essentially of

| $SiO_2$ | 55–60 | $K_2O$ | 8–9.5 |
|---|---|---|---|
| CaO | 20–23 | $Al_2O_3$ | 1.5–2.5 |
| $Na_2O$ | 7.5–9 | F | 5–7.5 |

20. A rigid information disk according to claim 17 wherein said glass-ceramic substrate in which the crystal phase consists predominantly of potassium fluorrichterite has a composition consisting essentially, expressed in terms of weight percent on the oxide basis, of

| $SiO_2$ | 58–70 | $K_2O$ | 3.8–7 |
|---|---|---|---|
| $Al_2O_3$ | 0.5–3 | $Li_2O$ | 0.5–2 |
| MgO | 13–17.5 | BaO | 0–2.5 |
| CaO | 3–7 | $P_2O_5$ | 0–2.5 |
| $Na_2O$ | 1.5–4 | F | 3–5.5 |

21. A rigid information disk according to claim 20 wherein said glass-ceramic substrate in which the crystal phase consists predominantly of potassium fluorrichterite, but also contains a substantial amount of cristobalite, has a composition consisting essentially, expressed in terms of weight percent on the oxide basis, of

| $SiO_2$ | 65–69 | $K_2O$ | 4.2–6 |
|---|---|---|---|
| $Al_2O_3$ | 0.75–3 | $Li_2O$ | 0.5–2 |
| MgO | 13.5–16.5 | BaO | 0–2 |
| CaO | 3–4.8 | $P_2O_5$ | 0–2 |
| $Na_2O$ | 1.5–3.3 | F | 3.3–5 |

* * * * *

REEXAMINATION CERTIFICATE (2447th)
United States Patent [19]
Alpha et al.

[11] B1 4,971,932
[45] Certificate Issued   Jan. 3, 1995

[54] MAGNETIC MEMORY STORAGE DEVICES

[75] Inventors: James W. Alpha, Corning; Walter L. Morgan, Painted Post; Linda R. Pinckney, Corning, all of N.Y.

[73] Assignee: Corning Glass Works, Corning, N.Y.

Reexamination Request:
No. 90/003,293, Dec. 30, 1993

Reexamination Certificate for:
Patent No.: 4,971,932
Issued: Nov. 20, 1990
Appl. No.: 314,883
Filed: Feb. 24, 1989

[51] Int. Cl.$^6$ ............................................. C03C 10/14
[52] U.S. Cl. ...................................... 501/3; 428/692; 428/693; 428/702
[58] Field of Search ................ 501/3, 4, 9; 427/128, 427/127; 428/426, 692, 693, 694, 695, 701, 702, 900

[56] References Cited
U.S. PATENT DOCUMENTS

| | | |
|---|---|---|
| 3,689,293 | 9/1972 | Beall . |
| 3,732,087 | 5/1973 | Grossman . |
| 4,386,162 | 5/1983 | Beall ........................................... 501/3 |
| 4,464,475 | 8/1984 | Beall et al. .................................. 501/9 |
| 4,467,039 | 8/1984 | Beall et al. .................................. 501/3 |
| 4,608,348 | 8/1986 | Beall et al. .................................. 501/3 |
| 4,690,846 | 9/1987 | Wada et al. ................................. 501/3 |

FOREIGN PATENT DOCUMENTS

62-72547  4/1987 Japan .
3210039  8/1988 Japan .

OTHER PUBLICATIONS

Rowlands et al. "Analysis of Steady State Crystal Nucleation Rates In Glasses", Ph. and Chem. of Glasses, vol. 20 No. 1, pp. 9–14, Feb. (1979).
West et al., "Crystallization of $Li_2O$–$SiO_2$ Glasses", Symposium of the Glass Division of American Ceramic Society, Apr. 26–28, 1971 pp. 151–165.
Morley, "Crystallization Kinetics in Some Silicate Glasses", Glass Technology, vol. 6, No. 3, Jun. 1965 pp. 77–89.

*Primary Examiner*—Karl Group

[57] ABSTRACT

The present invention is related to the fabrication of a magnetic memory storage device consisting essentially of a head pad and a rigid information disk, which disk consists essentially of a rigid substrate having a coating of magnetic media on the surface thereof facing the head pad. More particularly, this invention is directed to a substrate for use in the disk. The substrate is selected from two different groups of glass-ceramics: the first group contains a sheet silicate as the predominant crystal phase; and the second group contains a chain silicate as the predominant crystal phase.

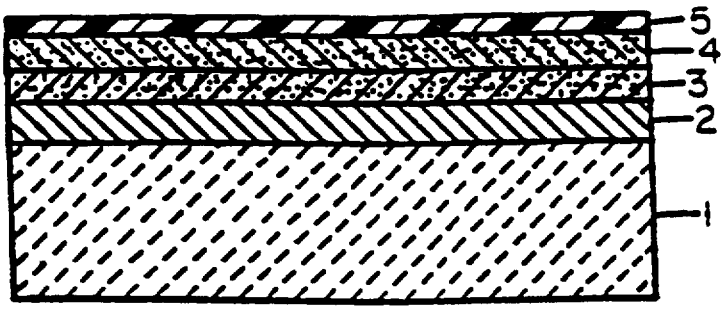

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-5 and 13-16 are cancelled.

Claims 1 and 12 are determined to be patentable as amended.

Claims 6-11 and 17-21 dependent on an amended claim, are determined to be patentable.

1. In a magnetic memory storage device consisting essentially of a head pad and a rigid information disk, said disk consisting essentially of a rigid substrate having a coating of magnetic media on the surface thereof facing said magnetic head, the improvement which comprises using a disk having a modulus of rupture ranging from about 15,000-40,000 psi and having a textured surface roughness of about $R_a = 1.5$-$5$ nm, in which said substrate consists essentially of a glass-ceramic wherein the predominant crystal phase present has a microstructure [selected from the group consisting of a sheet silicate and] *of* a chain silicate.

12. A rigid information disk for use in a magnetic memory storage device consisting essentially of a substrate with a coating of magnetic media on a surface thereof, in which said substrate consists essentially of a glass-ceramic wherein the predominant crystal phase present has a microstructure [selected from the group consisting of a sheet silicate and] *of* a chain silicate.

* * * * *